US007381568B2

(12) United States Patent
Zhang et al.

(10) Patent No.: US 7,381,568 B2
(45) Date of Patent: Jun. 3, 2008

(54) MASS DEFECT FILTER

(75) Inventors: Haiying Zhang, Princeton, NJ (US); Kenneth L. Ray, Bensalem, PA (US); Donglu Zhang, Belle Mead, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 953 days.

(21) Appl. No.: 10/858,738

(22) Filed: Jun. 2, 2004

(65) Prior Publication Data

US 2005/0272168 A1 Dec. 8, 2005

(51) Int. Cl.
*G01N 24/00* (2006.01)

(52) U.S. Cl. ...................................................... 436/173

(58) Field of Classification Search ..................... None
See application file for complete search history.

(56) References Cited

OTHER PUBLICATIONS

Hughey et al. "Kendrick Mass Defect Spectrum: A compact Visual Analysis for Ultrahigh-Resolution Broadband Mass spectra" Anal. Chem., 2001, v. 73, pp. 4676-4681.*

Hall et al. "'Mass defect' tags for biomolecular mass spectrometry", J. Mass Spectrom., 2003, v. 38, pp. 809-816.*

Bateman et al. "MSE with mass defect filtering for in vitro and in vivo metabolite identification", Rapid Comm. Mass Spectrom., 2007, v. 21, pp. 1485-1496.*

Shah et al. "Relative Mass defect Filtering of High-Resolution Mass Spectra for Exploring Minor Selenium Volatiles in Selenium-Enriched Green Onions", Anal. Chem., 2007, v. 79, pp. 846-853.*

Zhu et al. "Detection and Structural Characterization of Glutathione-Trapped Reactive Metabolites Using Liquid Chromatography-High -Resolution Mass Spectrometry and Mass Defect Filtering", Anal Chem., 2007, v. 79, pp. 8333-8341.*

Zhang, H., "A software filter to remove interference ions from drug metabolites in accurate mass liquid chromatography/mass spectrometric analyses", Journal of Mass Spectrometry. 2003, 38: 1110-1112.

Zhang, H., et al., "MSPurify: Leveraging High Resolution LC/MS Data to Identify Drug Metabolites Ions in Samples of Human Excreta", Proceedings of the 51st ASMS Conference on Mass Spectrometry and Allied Topics, Montreal, Quebec, Canada, Jun. 8-12, 2003.

* cited by examiner

*Primary Examiner*—Yelena G Gakh
(74) *Attorney, Agent, or Firm*—Terence J. Bogie

(57) ABSTRACT

A method for detecting and identifying metabolites in biological samples includes subjecting the samples to high resolution mass spectrometry (MS) analysis to detect ions of the molecular species. Mass defect values for the detected ions are determined. The method also includes specifying a predetermined range for mass defect values. Detected ions having mass defect values falling outside the specified range are discarded and those with mass defect values falling within the predetermined range are retained. Species of interest are determined from the retained values. The species of interest include drug metabolites or impurities and/or degradants of a known pharmaceutical sample.

26 Claims, 19 Drawing Sheets

| Element | Nominal Mass (Da) | Actual Mass (Da) | Mass Deficiency (relative to nominal mass) (Da) | Mass Deficiency (relative to nominal mass) (mDa) |
|---|---|---|---|---|
| H | 1 | 1.0078 | 0.0078 | 7.8 |
| N | 14 | 14.0031 | 0.0031 | 3.1 |
| C | 12 | 12.0000 | 0 | 0 |
| O | 16 | 15.9949 | -0.0051 | -5.1 |

Figure 1A

| Compound | Nominal Mass (Da) | Actual Mass (Da) | Mass Defect (relative to nominal mass) (Da) | Mass Defect (relative to nominal mass) (mDa) |
|---|---|---|---|---|
| CO | 28 | 27.9949 | -0.0051 | -5.1 |
| $N_2$ | 28 | 28.0061 | 0.0061 | 6.1 |
| $C_2H_4$ | 28 | 28.0312 | 0.0312 | 31.2 |

Figure 1B

| Type of Metabolism | Nominal Mass Change (Da) | Actual Mass Change (Da) | Mass Defect Change (Da) | Mass Defect Change (mDa) |
|---|---|---|---|---|
| + O (hydroxylation) | + 16 | + 15.9949 | - 0.0051 | - 5.1 |
| - $H_2$ (dehydrogenation) | - 2 | - 2.0156 | - 0.0156 | - 15.6 |
| - $CH_2$ (demethylation) | - 14 | - 14.0234 | - 0.0234 | - 23.4 |
| + $C_6H_8O_6$ (glucuronidation) | + 176 | + 176.0321 | + 0.0321 | + 32.1 |
| + $SO_3$ (sulfation) | + 80 | + 79.9568 | - 0.0432 | - 43.2 |
| - $C_{10}H_{15}N_3O_6S$ (glutathione) | + 305 | + 305.0681 | + 0.0681 | + 68.1 |

Figure 2

MASS DEFECT FILTER

BACKGROUND

A common objective in biological and pharmaceutical research is the detection and identification of drug metabolites. Biological samples or fluids may be subjected to liquid chromatography/mass spectrometry (LC/MS) analysis for detecting the presence of, as well as for identifying specific, metabolites. The biological samples may include plasma, bile, spinal fluid, joint fluid, other bodily fluids, tissue extract, urine, and fecal extract for example.

Detection and identification of metabolites with low concentration in the biological samples, however, is often difficult due to significant interference from endogenous species (ions). A metabolite ion signal in a mass spectrum may be embedded among ion signals of endogenous ions. As a result, a species of interest may not be easily identifiable even by those skilled in LC/MS analysis. For example, a metabolite ion may be isobaric (i.e. having the same nominal, or integral, mass-to-charge ratio) with a naturally occurring biological substance. LC/MS data from a high resolution instrument can assist in distinguishing the metabolite from an endogenous isobaric interference.

In pharmaceutical development, the detection and identification of drug impurities and degradants is also a common task. Pharmaceuticals (i.e. drug products) may be subjected to LC/MS analysis for detecting the presence of, as well as for identifying specific impurities or degradants. The bioavailability of relatively insoluble drugs can be greatly enhanced by the addition of polymeric emulsifying agents such as Cremophor and polyethylene glycol (PEG) to the dosage form.

However, detection and identification of metabolites, impurities and degradants arising from drug products formulated in complex excipients, for example polymeric emulsifying agents, is difficult due to significant interference from such agents. Due to their complex or polymeric nature, such additives or excipients produce complex patterns in the mass spectra of the samples containing the agents. A drug-related impurity ion signal that is the target of analysis in a mass spectrum may be embedded among ion signals of polymeric ions, and thus cannot accurately be detected. It is therefore desirable to exclude such excipient signals during the detection and identification of the desired targets.

Detection and identification of drug metabolites or impurities and degradants for determining the effectiveness or quality of drugs is highly desirable. Existing techniques such as background subtraction are inadequate for the desired detection and identification of either drug metabolites in biological samples, or impurities and degradants that may occur in the sample in combination with polymeric agents in the drug formulation. An improvement over existing techniques is therefore necessary to more selectively identify metabolites and drug impurities and degradants in biological samples or in complex formulations, especially those occurring at low concentrations or with unknown molecular identities.

Accordingly, the present invention provides improved methods for detecting and identifying metabolites in biological samples and impurities in drug samples formulated with emulsifying agents.

A mass defect filter may be utilized for obtaining the desired selectivity in detection and identification of drug metabolites and impurities/degradants.

SUMMARY

In one aspect, a method for detecting and identifying drug metabolites in biological samples is disclosed. The method includes subjecting the samples to high resolution mass spectrometry (MS) analysis to determine ionic mass. Typically, an analysis of biological samples for metabolites, degradants or impurities associated with pharmaceutical agents may range in molecular weight from about 100 to about 1200. Biological samples contemplated for analysis according to the invention include, for example, plasma, bile, urine, fecal extract, bodily fluid and tissue samples. As used herein, the term "pharmaceutical agent" includes pharmacologically active compounds, and salts, derivatives, solvates, enantiomers and other isomers, prodrugs, conjugates and polymorphic forms of such compounds. Such pharmaceutical agents may be prepared and administered in formulations comprising one or more additional pharmaceutical agents as well as additives such as solvents and excipients. Any known excipient is within the scope of formulation agents that may be detected by an analytical system according to the invention. Examples of well known polymeric excipients that are used in pharmaceutical formulations are marketed under the general brand name CREMOPHOR™, by Sigma Aldrich—(Fluka/Ronkonkoma/RdH Laborchemikalien) U.S.A, which is an emulsifying agent. Other emulsifying agents, dispersing agents and stabilizers may also be used.

As used herein, the term "metabolite" means a product of physiological processes involving one or several pharmaceutical agents, adjuvants, additives, or excipients used in formulation or combinations thereof. The term "degradant" means a product formed by the degeneration of a pharmaceutical agent or a component thereof, or of a co-formulated adjuvant, additive or excipient. It is contemplated that certain degradants could also be considered metabolites according to the foregoing definitions. The term "impurity," as used herein, means a compound (including but not limited to metabolites or degradants) that is present in a bulk product such as a pharmaceutical agent as a minor unintended fraction.

The analysis results in detection of ions. Mass defect values for the detected ions are determined. The method also includes specifying a range for mass defect values. Detected ions having mass defect values falling outside the specified range are discarded and those with mass defect values falling within the specified range are retained. Species of interest are determined from the retained values.

In another aspect, a system for detecting and identifying drug metabolites in biological samples is disclosed.

In a further aspect, a computer readable medium containing instructions is disclosed. The instructions, when executed on a computer, cause the computer to selectively remove ions unrelated to a drug and facilitate detection and identification of drug metabolites in biological samples.

In other aspects, methods and systems for detecting and identifying drug impurities and degradants in drug products are disclosed.

BRIEF DESCRIPTION OF THE DRAWINGS

The accompanying drawings, which are incorporated in and constitute a part of the specification, illustrate an embodiment of the invention and, together with the description, explain the invention. In the drawings, FIGS. 1A and 1B illustrate nominal and actual mass values for a plurality of elements and compounds;

FIG. 2 illustrates mass defects of Phase I & II metabolites;

DETAILED DESCRIPTION OF PREFERRED EMBODIMENTS OF THE INVENTION

The following description of the implementations consistent with the present invention refers to the accompanying drawings. The same reference numbers in different drawings identify the same or similar elements. The following detailed description does not limit the invention, rather the scope of the invention is defined by the appended claims.

In exemplary embodiments, a data processing method in conjunction with a physico-chemical analysis may be applied to remove interferences from biological matrices in high resolution mass spectrometry (MS) analysis of biological samples. The method may also be used to detect drug impurities and degradants in drug samples. The method includes a mass defect filter for filtering out mass defects from interference ions from drug metabolites or from drug impurities and degradants.

Mass defect is a known concept and can be represented, for example, by the residue mass (i.e. fractional or non-integral part) of the monoisotopic molecular weight of a compound. Chemical entities with identical nominal (i.e. integral) molecular weight may actually have different exact weights. It is calculated in relation to the ionic mass of a detected chemical entity, for example a pharmaceutical agent. This may be illustrated with reference to FIGS. 1A and 1B in which the mass defects of a plurality of elements and compounds are listed. The mass defect difference of the illustrated chemical entities arises from the difference in the chemical compositions (i.e. empirical formulae). Modern MS technology with high mass resolution power is capable of differentiating these chemical entities to distinct ion signals at the residue mass level in the mass spectrometry. For example, current high resolution MS technology may resolve isobaric ions that are separated by 50 mDa (milliDaltons) over a typical mass range.

A mass defect filter is a range of values typically associated with the mass defects for the metabolites associated with the expected assimilation or decomposition of a pharmaceutical agent.

A fixed mass defect filter may be used to remove interference ions in analyzing biological samples for drug metabolites. It should be understood that although the invention may occasionally be generally described herein in terms of the detection of metabolites, its various embodiments can also be applied to other target molecules of interest, such as degradants and impurities. As illustrated in FIG. 2, the mass defect of a drug and the mass defect of typical metabolites corresponding to the drug are often similar, typically within a 50 mDa range, even though their molecular weight difference may be much larger. In some instances, the molecular weight may have a range of a few hundred Daltons such as 200 Da for example. FIG. 2 illustrates the difference in the mass defects of a drug and its metabolites resulting from a typical metabolic transformations.

Figure 3:
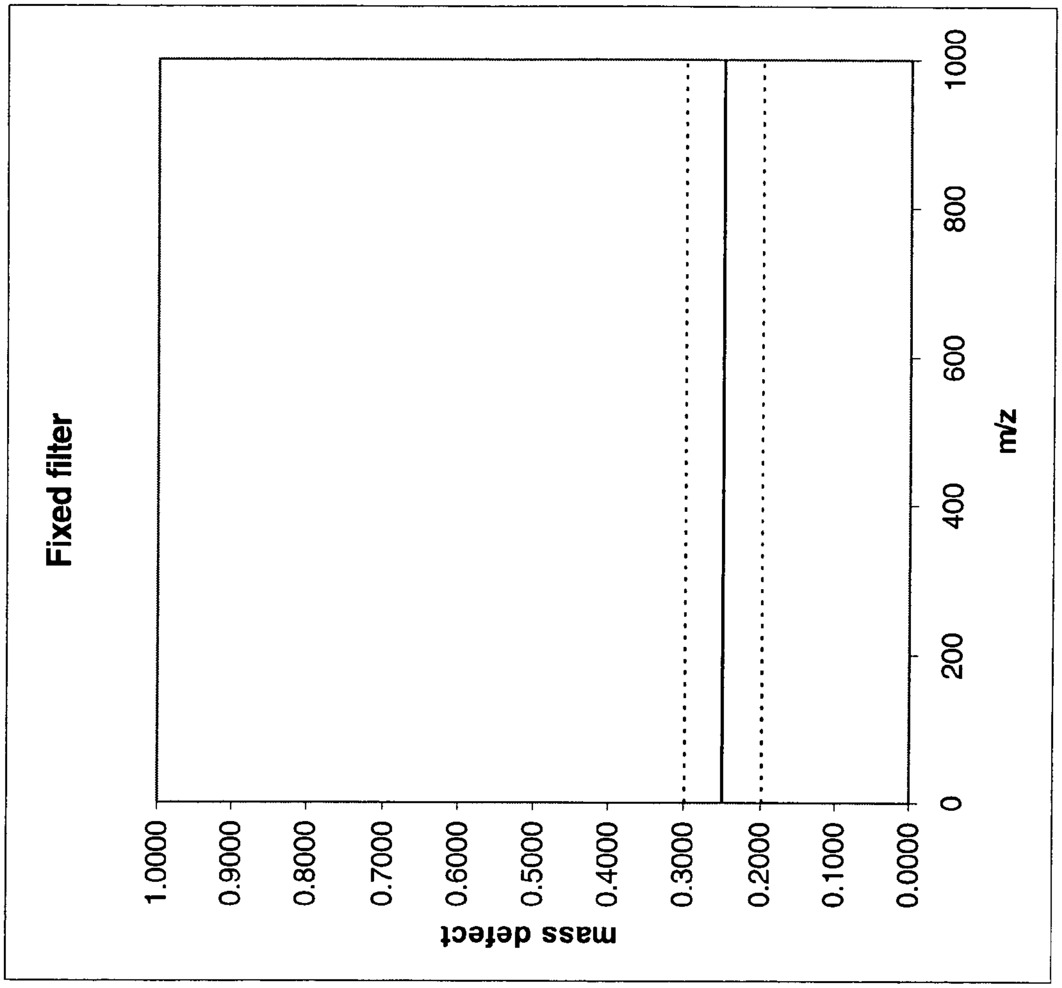
FIG. 3 illustrates a fixed mass defect filter in accordance with exemplary embodiments of the present invention.

In a fixed mass defect filter, such as illustrated in FIG. 3, a range of values for the mass defect may be specified. Interference ions falling outside this range may be discarded while ions falling within this range may be retained. The points of interest falling within this specified filter range (i.e. the retained values) may be taken into account in analyzing the biological sample. The range may be a constant value and as illustrated in FIG. 3, it may be set between 0.2 and 0.3 Da (i.e. 200 to 300 mDa) in this exemplary embodiment. That is, both the maximum and minimum value of the mass defect filter may remain constant over the mass range of interest. According to other embodiments of the invention, multiple filters may be established, each corresponding to a different mass range, to provide for the examination of a wide range of mass defects from components occurring in the sample during the identification of degradants or impurities. The use of multiple filters may be necessary for such samples because there is less predictability about the nature of the molecular species to be quantified. The mass defect filter parameters may be defined prior to examination of the acquired data based on the expected mass defect of the drug and the expected variation in the mass defects of its related modifications for example. The parameters may also be defined after examination of the acquired data based on observed trends in the actual acquired data for example.

The mass defect filter parameters are applied in relation to a specified mass range for the sample. The mass range is a pre-set scan range encompassing all the data points correlating to the detected molecular weights within that range. In the practice of the present invention, the mass range can include all the molecular weights within a data set, or it can be defined by the application of a selected mass defect filter to any subset of the data set.

In an experimental analysis of methods in accordance with exemplary embodiments, a bile sample obtained from a dog dosed with a proprietary pharmaceutical compound (having an empirical formula of $C_{24}H_{20}N_8O_2F_4$) was analyzed. High resolution LC/MS data of this drug metabolite sample was generated from a commercially available Q-ToF (quadrupole/time-of-flight) Ultima instrument manufactured by Micromass of Manchester, England. The data was processed using a mass defect filter designed to retain ion species with mass defects between 0.006 and 0.106 Da (6 to 106 mDa) in a mass range of 200-1100 Da. The filter was based on the observed mass (and mass defect) of the parent drug (529.056 Da) in the raw data file.

Figure 4A:
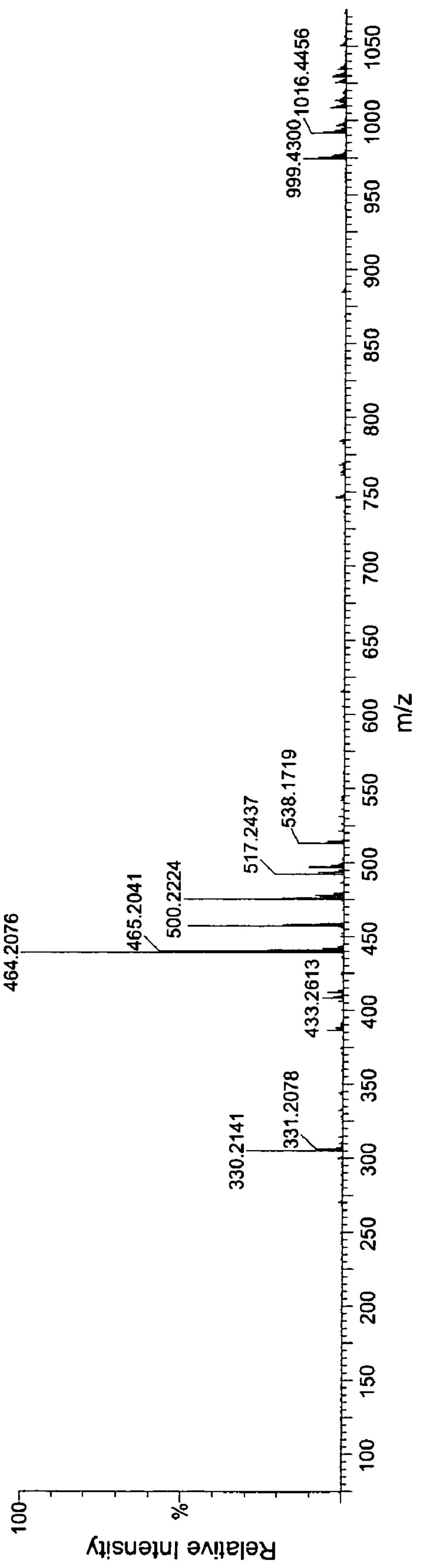
FIGS. 4A and 4B illustrate mass spectra of a metabolite at a particular time in unprocessed and processed forms.
Figure 4B:
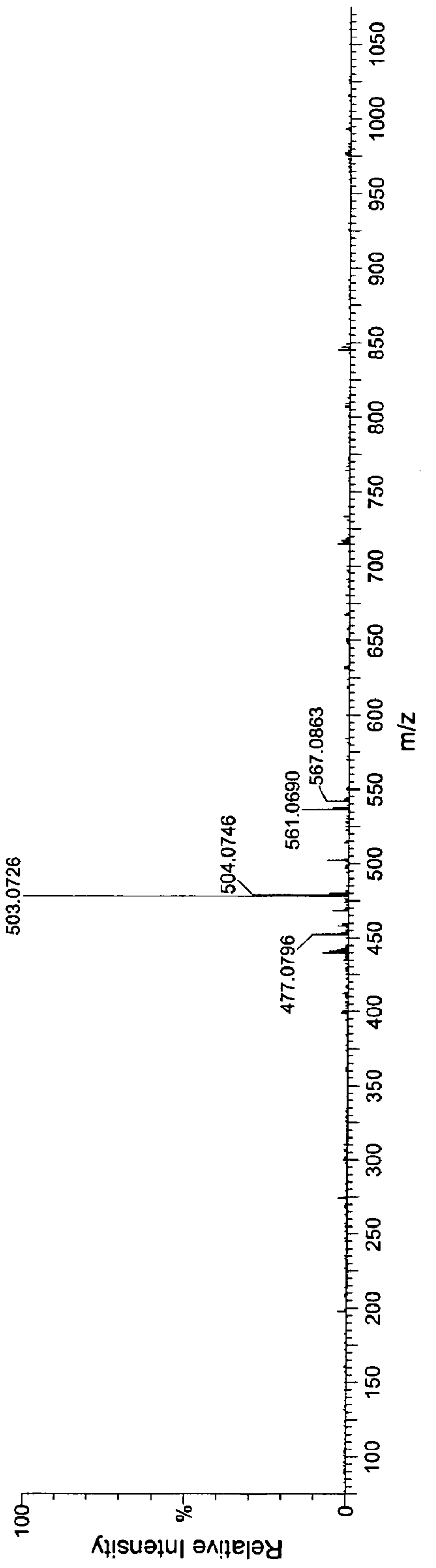

FIGS. 4A and 4B illustrate the effect of the mass defect filter on the LC/MS data at a single point in time in the data set. Referring to FIG. 4A, the mass spectrum at retention time 35.5 minutes obtained from un-processed data illustrates a metabolite-related ion embedded among irrelevant endogenous species. In contrast, in FIG. 4B, the processed mass spectrum data illustrates the metabolite ion (503.0729 Da) prominently. In FIG. 4B, very few interference ions that were present in FIG. 4A are detectable. The selective removal of interferences in the processed data facilitates the identification of metabolite ions that otherwise would not be easily identified.

Figure 5A:
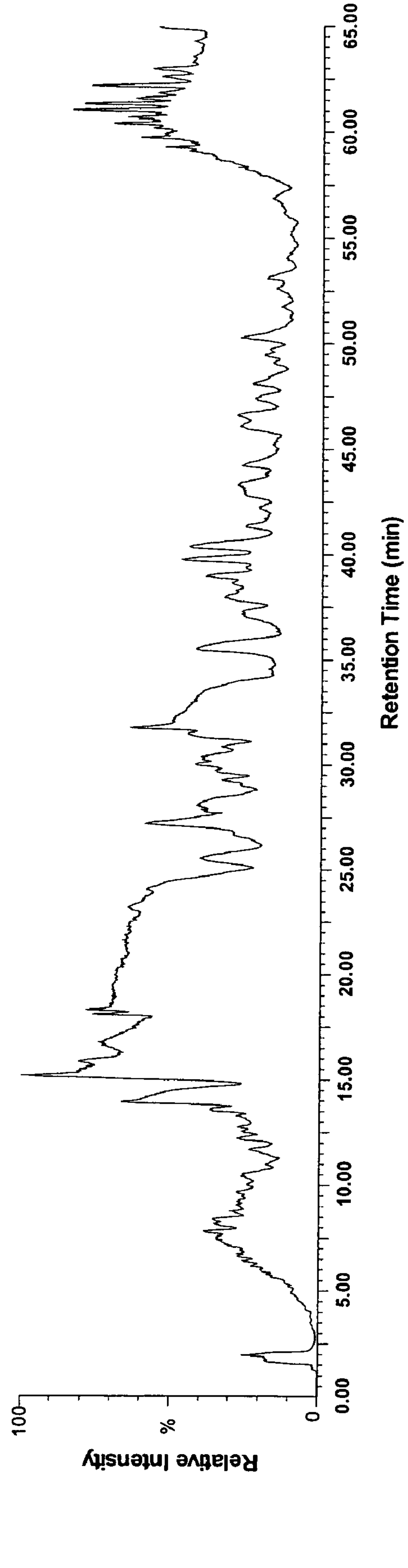
FIGS. 5A to 5C illustrate metabolite profiles of a compound in dog bile.
Figure 5B:
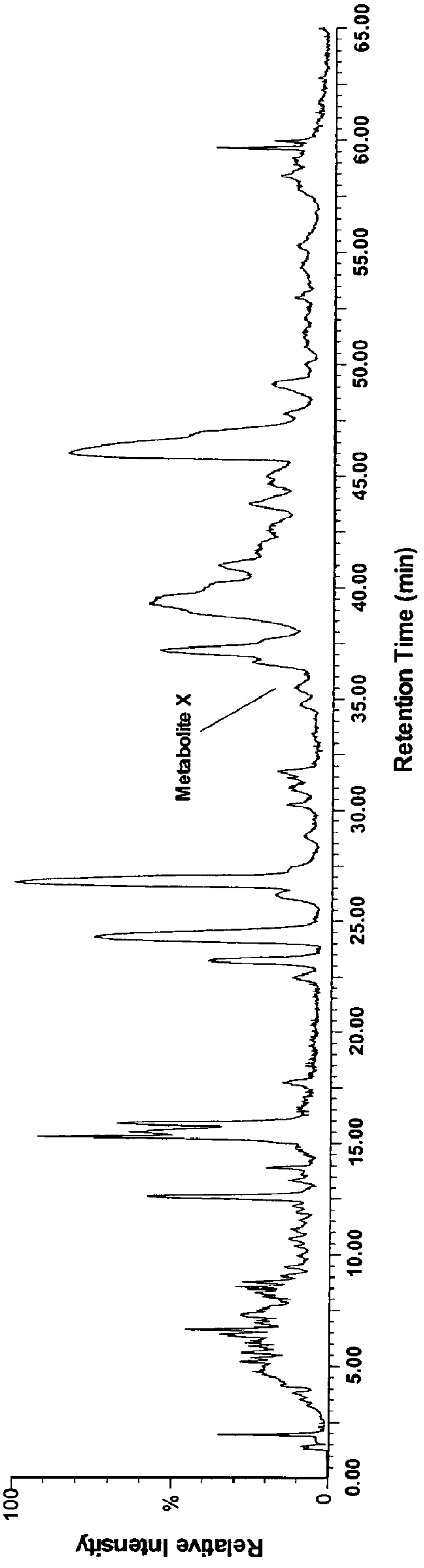
Figure 5C:
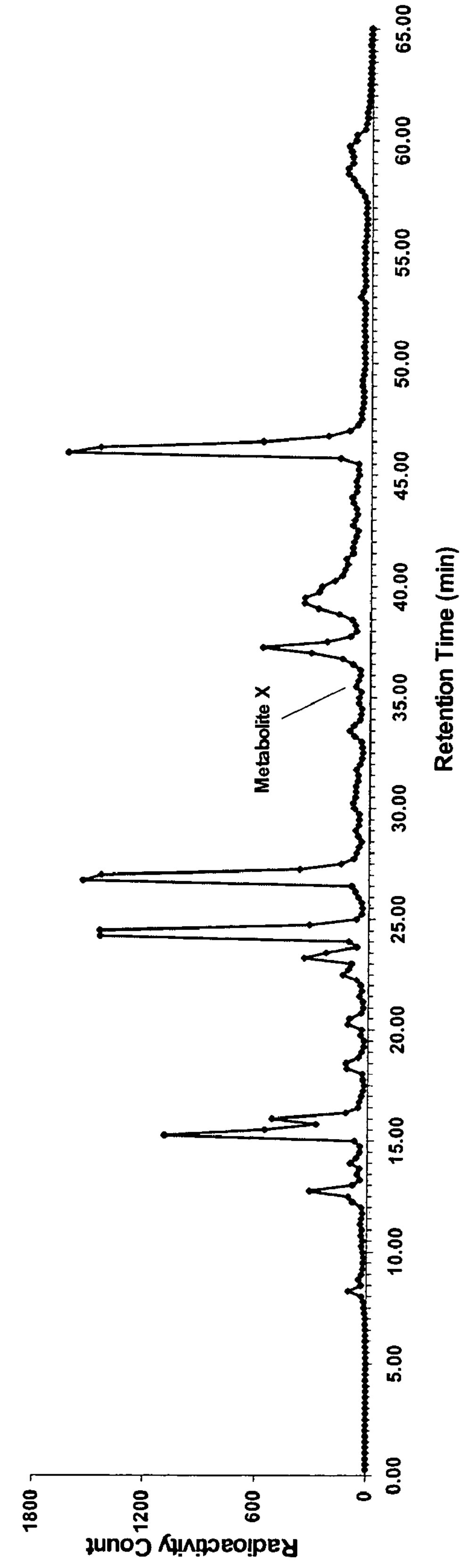

FIGS. 5A to 5C illustrate the effect of the mass defect filter on the total ion chromatogram. The total ion chromatogram (TIC) represents the total mass spectral signals acquired at each time point along the time scale. Due to the very large number of interfering ions arising from biological matrices, the TIC may not reliably indicate the presence of any metabolite peaks. As illustrated in FIG. 5A, the unprocessed TIC shows little indication of the distinct metabolites. In contrast, the processed TIC, as illustrated in FIG. 5B, bears a remarkable resemblance to the HPLC-radio-chromatographic profile of FIG. 5C which illustrates a reference standard for the authentic metabolite profiles.

Figure 6:
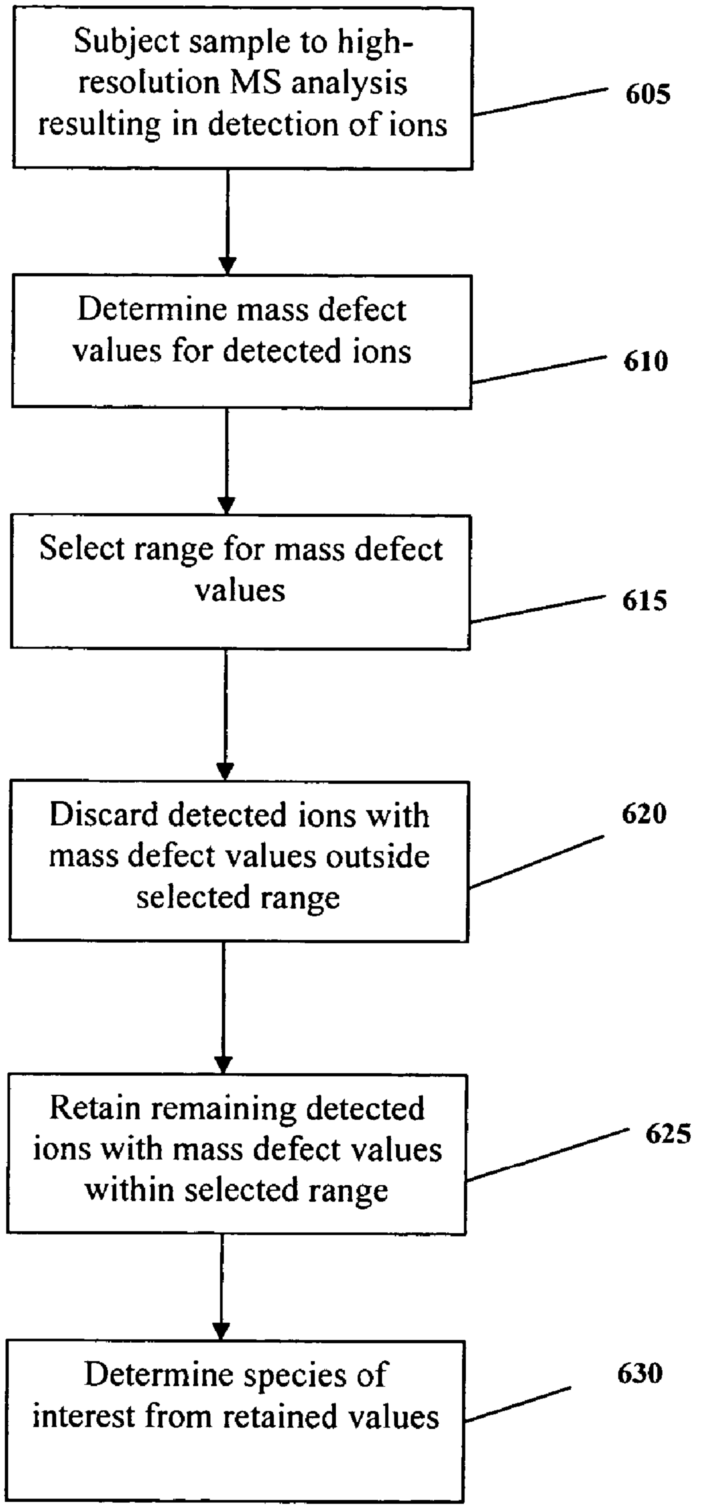
FIG. 6 illustrates a method in accordance with exemplary embodiments of the present invention.

Exemplary methods may be described with reference to flow chart 600 illustrated in FIG. 6. A biological sample may be subjected to a mass spectrometric analysis at 605. This analysis may result in detection of ions. Mass defect values for the detected ions may be determined at 610 by a computing process such as that performed by a personal computer for example. A range for mass defect values may be specified at 615. The range may also be predetermined as previously described. Detected ions with mass defect values outside the specified range may be discarded at 620. The remaining detected ions (i.e. those having mass defect values within the specified range) may be retained at 625. The retained values may be used to determine species of interest according to MS structure elucidation practices at 630. Species of interest may include drug metabolites or impurities and/or degradants of a known sample.

In other embodiments, a data processing method may remove polymeric and related interferences in a high resolution MS analysis of drug products. The method may include a mass defect filter for filtering out ions that would otherwise interfere with the ionic species of the drug impurities and degradants of interest. The mass defect filter in such applications may therefore suitably be scalable with respect to mass. Mass defects generally increase with mass for drug related impurities and degradants and for polymeric interferences from commonly used formulation emulsifiers.

Figure 7:
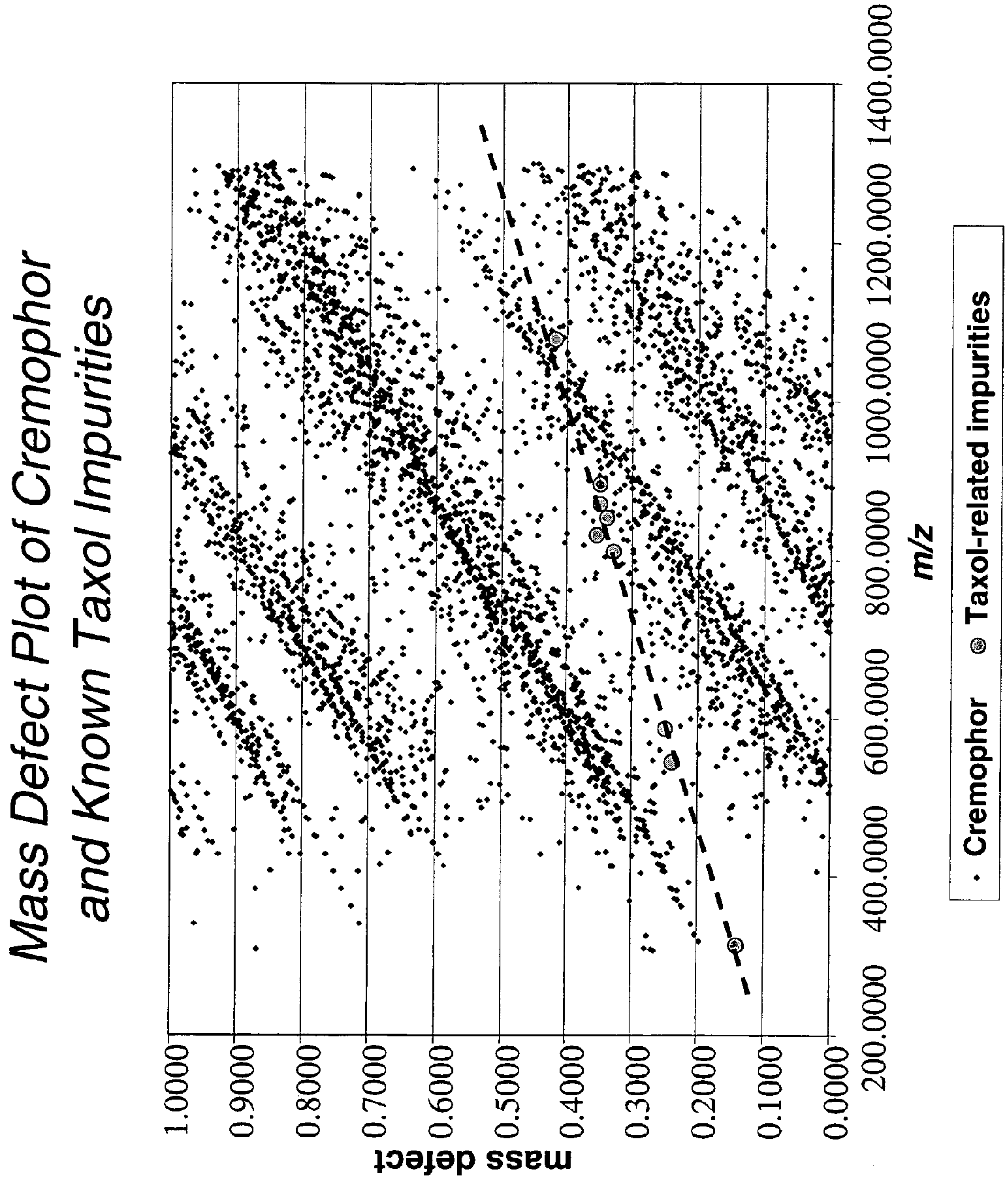
FIG. 7 illustrates a mass defect plot of Cremophor and known Taxol impurities.

The increasing mass defect may be illustrated in FIG. 7 in which the linearly increasing bands indicate the presence of polymeric interferences. The specified mass defect range (or the difference between the maximum and minimum acceptable mass defects) in this case may also be a constant value. The maximum and minimum values, however, increase as a function of the m/z scale. As with the fixed mass defect filter described above (illustrated in FIG. 3), the ions whose mass defect values fall outside the range may be discarded and those within taken into account in analysis of the sample.

In an experimental analysis of methods in accordance with exemplary embodiments with the scalable mass defect filter of FIG. 7, a batch of Taxol was analyzed. The sample contained the anti-cancer drug paclitaxel formulated in Cremophor, a polymeric emulsifying agent. High resolution LC/MS data of Taxol was generated from the aforementioned commercially available Micromass Q-TOF Ultima instrument.

Figure 8:
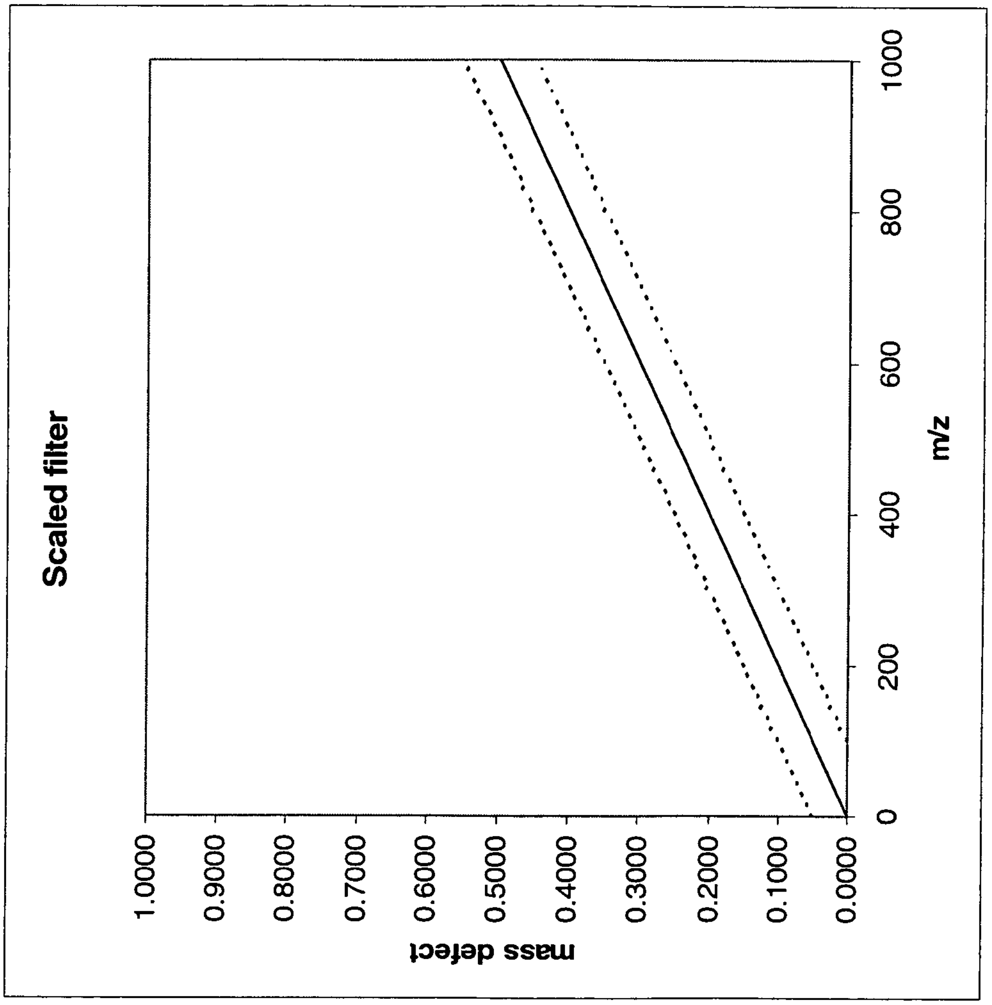
FIG. 8 illustrates a scalable mass filter in accordance with exemplary embodiments of the present invention.

As illustrated in FIG. 8, a line along which the mass defects of paclitaxel and its known degradants and impurities as a function of m/z values may be established by appropriate linear regression methods. A 60 mDa range maybe super-imposed over this line with a 30 mDa range on either side for example. This range may represent the mass defect filter. All ions whose mass defects lie outside this range may be discarded as they are expected to be mostly interference ions. Those ions whose mass defects lie within this range may be retained as they are expected to be mostly drug related ions.

Figure 9A:
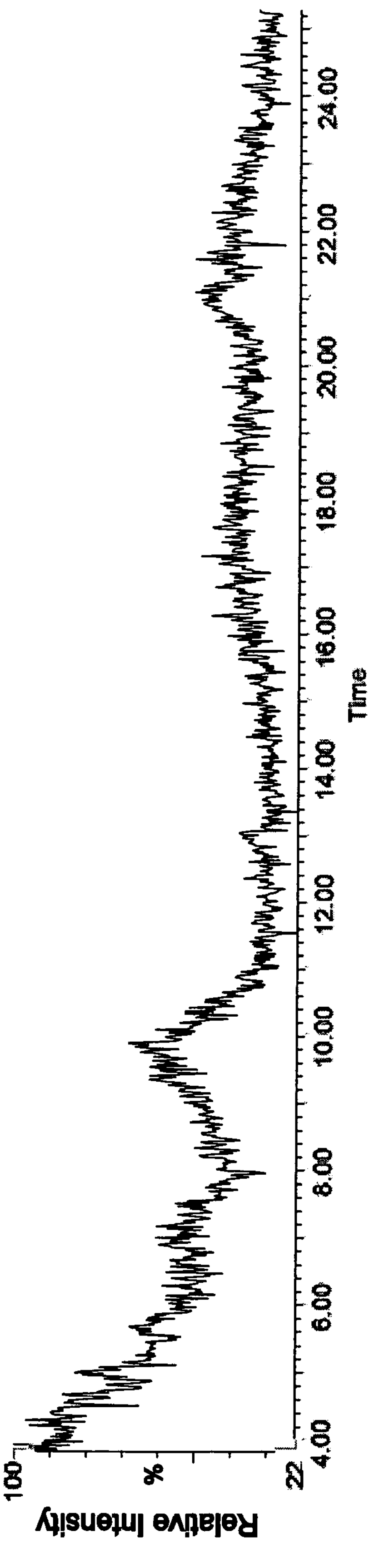
FIGS. 9A and 9B illustrate the total ion chromatogram (TIC) of Taxol sample before and after processing according to exemplary embodiments and FIG. 9C illustrates a ultraviolet (UV) reference standard for Taxol impurity profile.
Figure 9B:
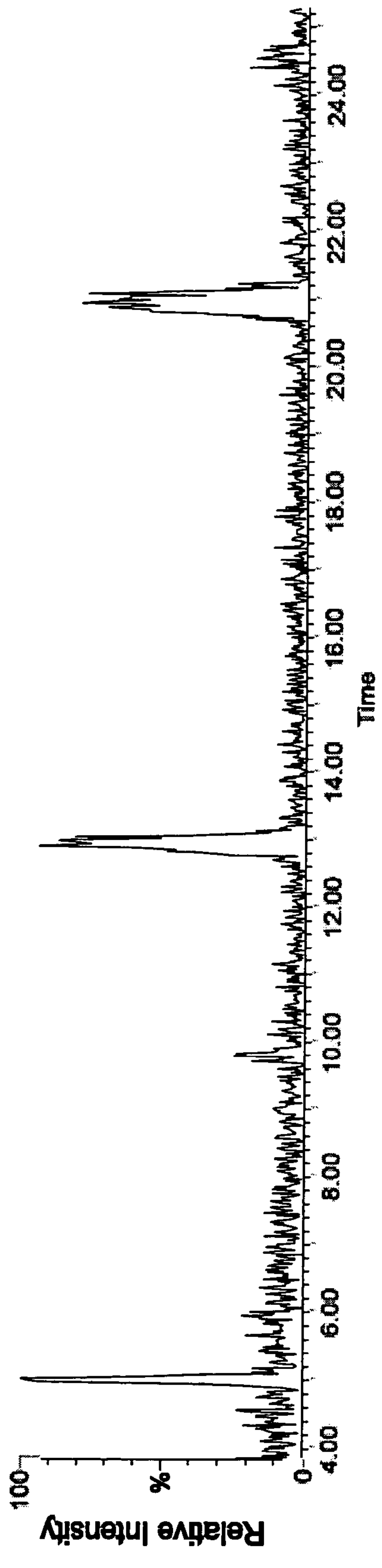
Figure 9C:
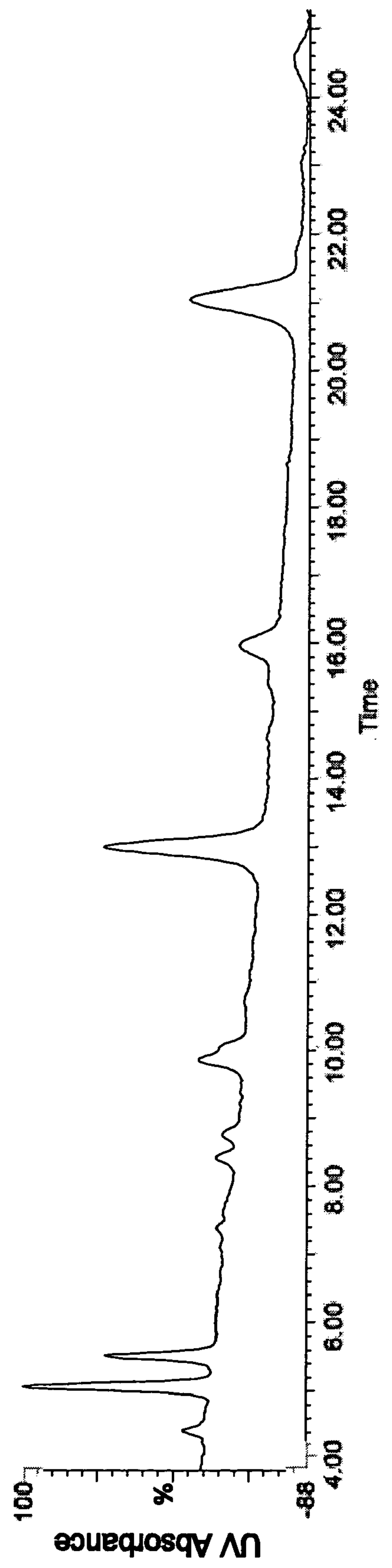

As illustrated in FIG. 9A, impurity and degradant peaks in the TIC are not easily detectable or identifiable as they are obscured by the polymeric interferences of Cremophor. In contrast, as illustrated in FIG. 9B, these peaks may be observed clearly after the filtering process is completed. The validity of the mass defect filter approach is supported by the correlation of peaks in the processed data to peaks in the UV profile of FIG. 9C that is the reference standard for the authentic impurity profiles.

Figure 10A:
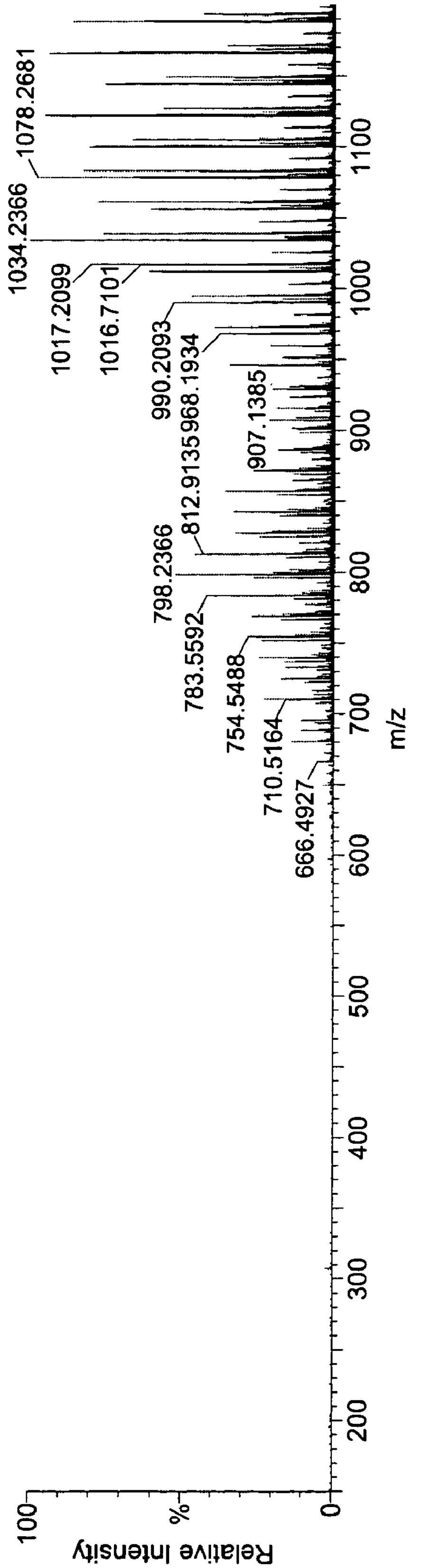
FIGS. 10A and 10B illustrate mass spectra of Taxol before and after processing according to exemplary embodiments and FIG. 10C illustrates the mass spectra after background subtraction processing.
Figure 10B:
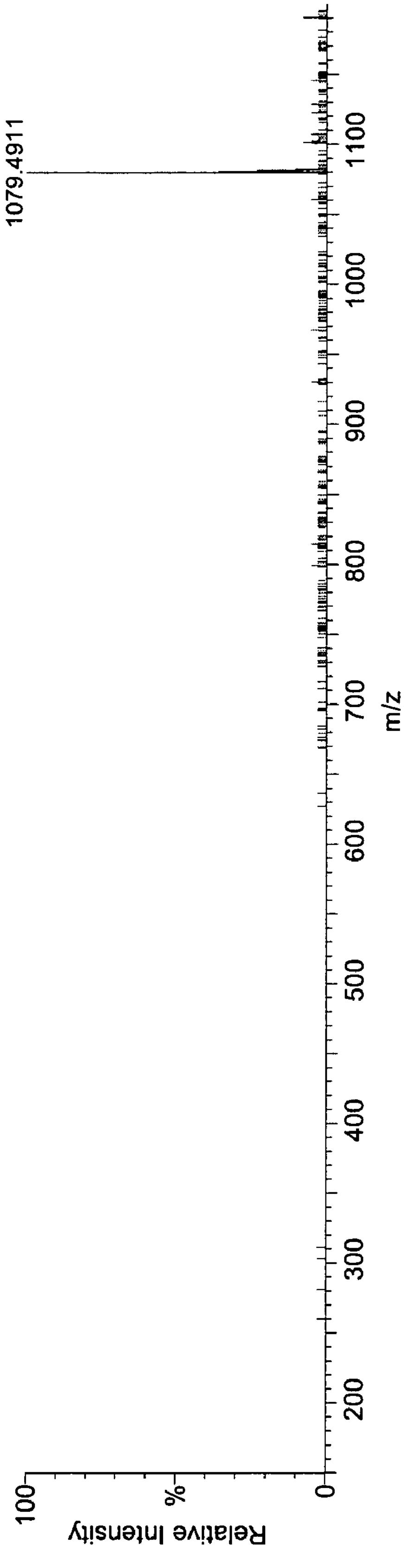
Figure 10C:
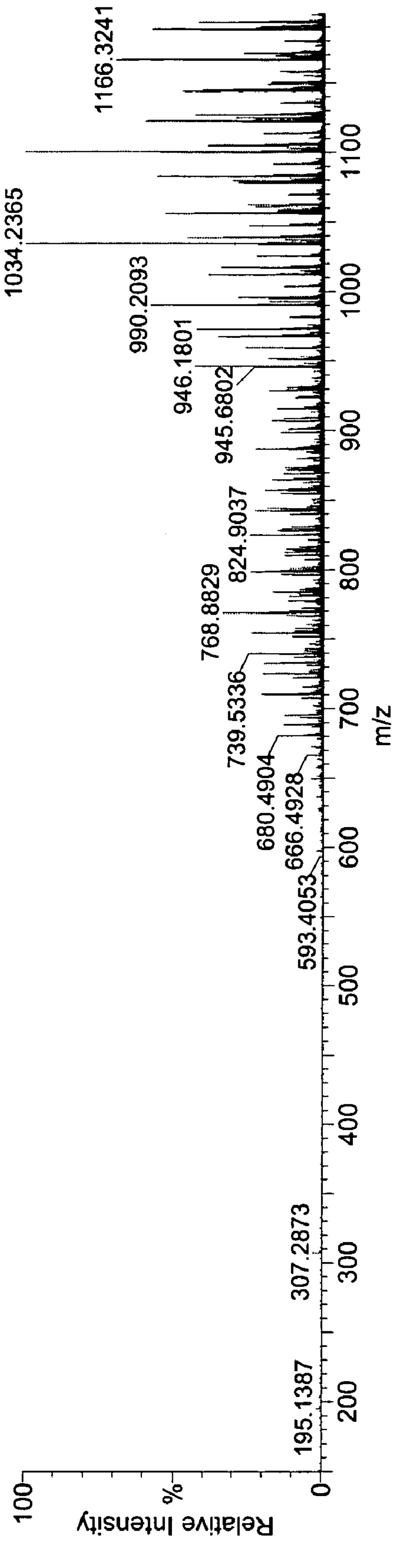

Similarly, FIG. 10A illustrates unprocessed mass spectra for a chromatographic peak in which the mass signal of interest is not obvious. In contrast, FIG. 10B illustrates processed mass spectra for the same peak in which the mass signal of interest may easily be identified. FIG. 10C illustrates mass spectra resulting from existing background subtraction processing methods which is closer to the unprocessed spectra of FIG. 10A. Exemplary embodiments provide significant improvement in detection over existing methods such as background subtraction processing.

Figure 11:
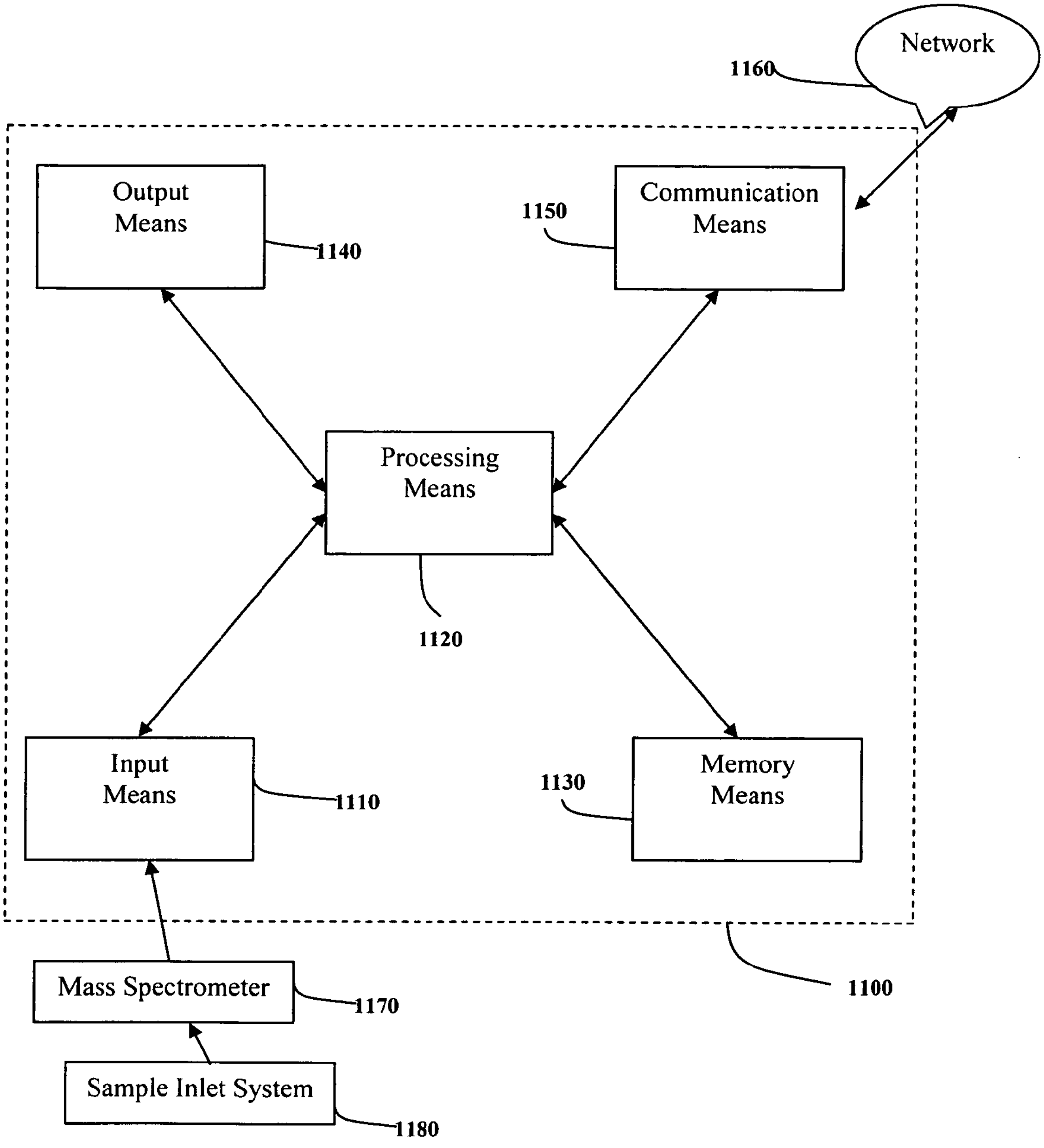
FIG. 11 illustrates a system in accordance with exemplary embodiments.

In exemplary embodiments, the methods described may be implemented on a computer such as computer 1100 illustrated of FIG. 11. Computer 1100 may be a handheld computer, a laptop computer, a desktop computer or the like. Computer 1100 may comprise an input means 1110, a processing means 1120, a memory means 1130, an output means 1140 and a communication means 1150. Input means 1110 may be a keyboard, a mouse or the like. The detected ions (and the corresponding mass defect values intrinsic to their mass values) may, for example, be provided by a mass spectrometer 1170 to computer 1100 via input means 1110. The detected ions may also be received by computer 1100 via communication means 1150 over a network 1160. Network 1160 may, for example, be the Internet. An Ethernet cable may also facilitate the communication between the mass spectrometer 1170 and computer 1100.

The detected ions and the corresponding mass defect values may be stored in memory means 1130. The specified range for mass defect values may also be received by computer 1100 and stored in memory means 1130. Output means 1140 may be a display (or monitor) or a printer. Data from computer 1100 may also be output to other devices via communication means 1150.

Processing means 1120 may be a well known processor such as that used in a personal computer for example. Processing means 1120 may be a plurality of processors. Processor 1120 may be programmed to compare the mass defect values of the detected ions with the specified range of mass defect values. Based on the comparison, processor 1120 may retain mass defect values falling within the specified range as well as discarding mass defect values falling outside the specified range. The retained values may be stored at a memory location within memory means 1130; similarly, discarded values may also be stored at a separate location within memory means 1130. The ion detection and the determination of the mass defect values corresponding to the detected ions may be accomplished by the Q-ToF Ultima instrument mentioned above or any mass spectrometer capable of exact mass measurements. In exemplary embodiments, a sample may be provided to mass spectrometer 1170 by a liquid chromatography system 1180 or a similar sample inlet system.

Exemplary methods may also be programmed as a set of executable instructions on a computer readable medium. The medium may be a computer disk such as a floppy or a compact disc. The programmed instructions in the computer readable medium, in conjunction with a processor or a computer, may be executed by the processor to perform methods of the exemplary methods. Exemplary methods may also be implemented via hardware such as an application-specific integrated circuit (ASIC) programmed to perform the method as described.

In exemplary embodiments, more than one mass defect filter may be applied to a single data set. One may also define a mass defect filter that has a time-dependence such that only a specific range of retention times in the chromatograph are filtered. A filter may be defined that is dependent on the mass range of a subset of data, so that only species within the defined mass range may be filtered. A dynamic mass defect filter may be defined such that the criteria for the filter are automatically determined based on a computer-driven examination of the data set without human intervention.

Furthermore, a combination filter or multiple filters may also be utilized particularly, though not solely, in the analysis of degradants or impurities, which can be of widely varying molecular weights and ionic masses. The combination or multiple filters may comprise a fixed filter over a particular range and a scalable filter over another range. A multi-filter may also include a series of fixed filters or a series of scalable filters or a combination thereof. For example, two fixed filters may be used for metabolite analysis—one for detecting metabolites having a molecular weight around the range of the parent drug and one for detecting metabolites that are much above the mass of the parent drug (such as glutathione that may be over 300 Da above the mass of the parent drug). In another example, a fixed filter may be used over the approximate mass range of the expected metabolites and a scalable filter may be used over a mass range less than that of the drug and its metabolites in case the drug splits into two parts during metabolism. The scalable filter may be linear or non-linear and may be based on determining a relationship between the mass defect over a mass range of interest.

In other embodiments, a variable width window for the mass defect filter may be used such that the acceptance criteria for the mass defects is more restrictive (or more tolerant) at a given mass than at a different mass. In other words, an acceptable or specified mass defect range at a particular point on the mass range of interest scale may be different (i.e. smaller or larger) than an acceptable or specified mass defect range at another point on the mass range of interest scale. In this case, the mass defect filter may be viewed as a series of scalable filters over a mass range of interest.

The mass defect filter may also be used in conjunction with other data processing techniques, either to prepare data for subsequent processing by additional techniques or to further process data that has been prepared for processing by a different data processing technique. While the description has highlighted LC/MS analysis, exemplary embodiments of the present invention may also be effective utilizing high resolution mass spectrometry without the liquid chromatography component. Non-limiting examples of analytical techniques that may be used in combination with high resolution mass spectrometry instead of LC include capillary electrophoresis (CE), direct infusion (in which the sample is not previously separated before MS analysis), and matrix assisted laser desorption and ionization (MALDI) mass spectrometry (in which no liquid carrier is required).

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention.

The following claims and their equivalents define the scope of the invention.

The invention claimed is:

1. A method comprising the steps of:

subjecting a biological sample to a high resolution mass spectrometry (MS) analysis;

detecting the ionic masses of ions from said analysis, said ionic masses forming an initial mass range;

determining mass defect values for the detected ions in the initial mass range;

specifying a first range of mass defect values comprising a mass defect filter;

discarding detected ions having mass defect values outside the mass defect filter range;

retaining detected ions having mass defect values within the mass defect filter range; and determining species of interest from the retained ions to detect and identify drug metabolites in the biological sample.

2. The method of claim 1, wherein the biological sample is one of plasma, bile, urine, fecal extract, bodily fluid or tissue sample.

3. The method of claim 1, wherein the sample subjected to MS analysis is first analyzed by a liquid chromatography (LC) system.

4. The method of claim 1, wherein the specified mass defect filter range is constant over the initial mass range.

5. The method of claim 4 wherein the initial mass range includes all the mass defects determined for a data set.

6. The method of claim 4 wherein the initial mass range includes a subset of all the mass defects determined for the data set.

7. The method of claim 6 further comprising specifying a second mass defect filter range over another mass range, said other mass range being distinct from the initial mass range.

8. The method of claim 7, wherein the second mass defect filter range is constant.

9. The method of claim 1 wherein the method is used to detect the presence of metabolites in the biological sample.

10. The method of claim 1 wherein the method is used to detect the presence of impurities or degradants in the biological sample.

11. A method for detecting and identifying impurities in a drug sample, the method comprising the steps of:

subjecting the sample to a high resolution mass spectrometry (MS) analysis to detect the ionic masses of ions in a chosen mass range;

determining mass defect values for detected ions in the mass range;

specifying a range of mass defect values comprising a first mass defect filter range;

discarding detected ions having mass defect values outside the first mass defect filter range;

retaining detected ions having mass defect values within the first mass defect filter range; and determining species of interest from the retained ions.

12. The method of claim 11, wherein the sample subjected to MS analysis is first analyzed by a liquid chromatography (LC) system.

13. The method of claim 11, wherein the drug sample comprises pharmaceutical agents formulated with polymeric emulsifying agents.

14. The method of claim 11, wherein the specified first mass defect filter range is scalable in relation to mass over an initial mass range.

15. The method of claim 14, wherein the mass defect over the first mass defect filter range increases with increased mass.

16. The method of claim 15, wherein the mass defect increase is linear.

17. The method of claim 15, wherein the mass defect increase is non-linear and is based on determining a relationship between the mass defect range and the mass.

18. The method of claim 14 further comprising:

specifying a second mass defect filter range over another mass range.

19. The method of claim 18 wherein the second mass defect filter range is a constant value.

20. The method of claim 18 wherein the second range mass defect filter range is scalable in relation to mass.

21. The method of claim 11 wherein the drug sample is a biological sample selected from plasma, bile, urine, fecal extract, bodily fluid or tissue samples.

22. The method of claim 11, wherein the impurities in the drug sample comprise degradants.

23. A system for detecting and identifying impurities in pharmaceutical samples, said system comprising:

a high resolution mass spectrometer to detect ions of the impurities;

a processor configured to execute instructions which cause the system to perform a method comprising:

determining mass defect values for ions detected from said analysis;

specifying a range for mass defect values comprising a mass defect filter range;

comparing mass defect values of detected ions of the impurities within the specified range;

retaining mass defect values of ions of the impurities falling within the specified range; and determining impurities from the retained values.

24. The system of claim 23, wherein retaining mass defect values occurs in a computer memory.

25. A system for detecting and identifying drug metabolites in biological samples, said system comprising:

a high resolution mass spectrometer to detect ions of the metabolites;

a processor configured to execute instructions which cause the system to perform a method comprising:

determining mass defect values for ions detected from said analysis;

specifying a range for mass defect values comprising a mass defect filter range;

comparing mass defect values of detected ions of the metabolites within the specified range;

retaining mass defect values of ions of the impurities falling within the specified range; and determining metabolites from the retained values.

26. A computer readable medium containing executable instructions which, when executed in a processing system, cause the system to perform a method comprising:

subjecting a biological sample to a high resolution mass spectrometry (MS) analysis to detect ions;

detecting the ionic masses of ions from said analysis, said ionic masses forming an initial mass range;

determining mass defect values for the detected ions in the initial mass range;

specifying a range for a mass defect value comprising a mass defect filter;

discarding detected ions having mass defect values outside the mass defect filter range;

retaining detected ions having mass defect values within the mass defect filter range; and determining species of interest from the retained ions to detect and identify drug metabolites in the biological sample.

* * * * *

UNITED STATES PATENT AND TRADEMARK OFFICE
Certificate

Patent No. 7,381,568 B2 Patented: June 3, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Haiying Zhang, Princeton, NJ (US); Kenneth L. Ray, Bensalem, PA (US); Donglu Zhang, Belle Mead, NJ (US); and Xin Wang, Princeton, NJ (US).

Signed and Sealed this Twelfth day of May 2009.

WALTER D. GRIFFIN
*Supervisory Patent Examiner*
Art Unit 1797